Jan. 21, 1947.     C. R. ANDERSON     2,414,503
DAMPER
Filed May 12, 1944

Inventor
Carl R. Anderson
By Richmond A. Hayes
Attorney

Patented Jan. 21, 1947

2,414,503

UNITED STATES PATENT OFFICE 2,414,503

DAMPER

Carl R. Anderson, Erie, Pa., assignor to Swanson Tool and Machine Products, Erie, Pa., a partnership of Pennsylvania Application May 12, 1944, Serial No. 535,282

3 Claims. (Cl. 126—292)

1

This invention relates to an improvement in dampers and more particularly to those employed in the draft control of stacks or pipes.

Prior to this invention it has been the practice, in the manufacture of a stack or pipe damper, to provide a spindle that was formed with, or include, a permanently attached handle at one end and at the other end was pointed. It was intended that the pointed end be utilized to pierce and project through a conventional stack or pipe. When a damper was assembled with this type of spindle, the pointed end always extended beyond the pipe and represented a very considerable hazard at such times as the damper was installed or replaced, or the pipe cleaned. Furthermore, with this type of spindle, and because of the sharp, unprotected, pointed end, there was a constant hazard during manufacture, packaging, and all other handling of this type of spindle.

The present invention is directed to the provision of a damper supporting spindle of such design and construction that many desirable advantages are to be derived from its use. The spindle at one end terminates in a smooth, rounded head, and at the other end, in a point. A handle assembly is applicable to the pointed end of the spindle immediately on manufacture of these parts, and thus, until such time as a damper is assembled and the spindle and handle are separated, no hazard is presented in the packaging, displaying, or other handling of the parts. It is found highly advantageous to provide a damper operating spindle that comprises only three parts; namely, a spring handle assembly, a spindle, and damper. In the past considerable difficulty was experienced in installing a damper or replacing a worn or rusted handle and spindle, this being particularly evident when it was attempted to project the pointed end of the spindle through a pipe or stack. Resort was frequently made to the application of force on the spindle handle through the use of a hammer or similar instrument for the purpose of causing the pointed end of the spindle to pass through the pipe into position of assembly. Such force frequently resulted in jamming the spindle handle, flattening the pipe, or in some instances spindle and damper. With the present invention any possibility of damage to the spindle is eliminated, even though force may be applied, since the rounded head cannot readily be damaged by such force. A most important advantage of the present spindle structure lies in the provision of a handle that includes a spring assembly by means of which the handle and pointed end of the spindle may be se-

2 cured in engaged position and prevented inadvertent relative rotation when the spindle, damper, and handle are properly installed.

Further advantages will be found from a consideration of the following specification, taken in conjunction with the accompanying drawing; and in which Fig. 1 is a fragmentary vertical sectional view of a stack or pipe in which is located a damper and mounting structure embodying one form of the invention;

Figure 1:
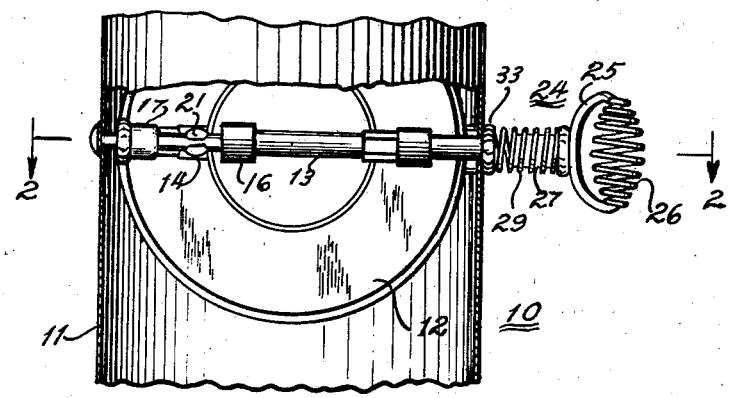

Referring particularly to the drawing, the reference numeral 10 is employed to generally designate a pipe, damper, and spindle structure embodying the invention. A stack or pipe 11 is fitted with a damper 12, mounted on a spindle 13. Insofar as this invention is concerned, the damper may be of conventional structure provided it includes or is formed with loops, such as shown at 14 and 16, which provide a receiving area for the spindle 13.

At diametrically opposite edges of the damper, semi-circular collar portions 17 and 18 are formed, the portion 18 serving as a bearing against the inner surface of the pipe 11 when the damper is installed.

Figures 3, 4, 5, 6:
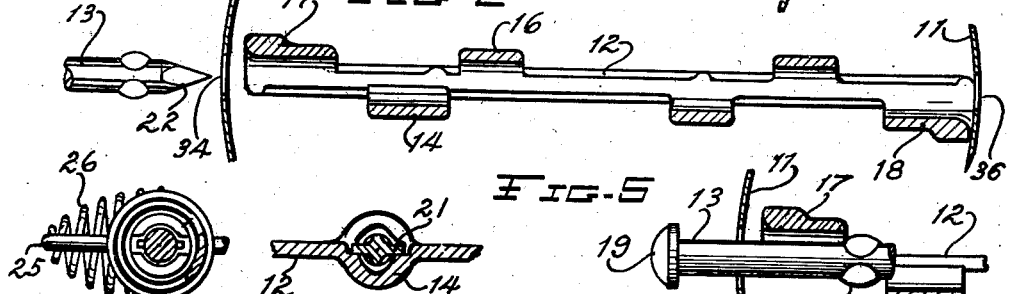
Fig. 3 is a transverse sectional view taken substantially on the line 3—3 of Fig. 2 and shows a detail of the handle and damper rod structure.
Fig. 4 is a transverse sectional view taken substantially on the line 4—4 of Fig. 2.
Fig. 5 is a view taken similarly to Fig. 2 and shows the damper supporting rod in position to be inserted through the pipe and damper.
Fig. 6 is a fragmentary sectional view showing the structure by which relative rotation of the damper and supporting rod is prevented.
Figure 7:
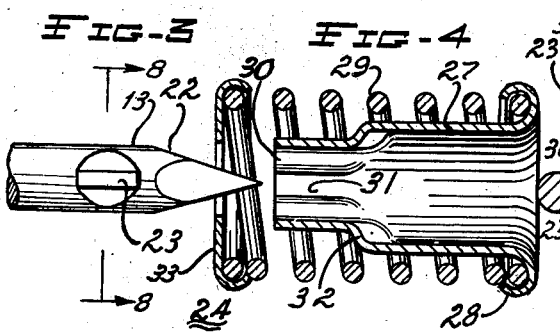
Fig. 7 is a fragmentary exploded view of the damper rod and handle.
Figure 8:
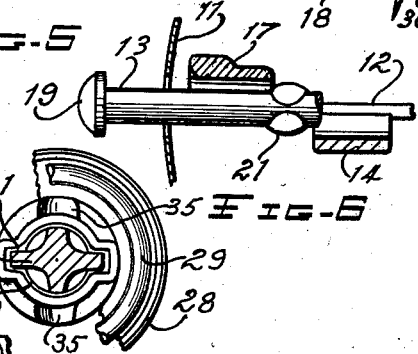
Fig. 8 is an end view of the handle taken in the direction of the line 8—8 of Fig. 7.

The damper spindle 13 is formed at one end with a round, smooth head 19, and this head, as is clearly indicated in the drawing, constitutes the only other portion of the damper assembly, in addition to the handle, that appears exteriorly of the pipe. Formed in the body of the spindle, or attached thereto in any suitable manner, are lugs or ears 21. These lugs are adjacent the head 19 and are intended to seat within one of the loops 14, substantially as shown in Fig. 4 of the drawing, for the purpose of preventing relative rotation of the spindle and damper.

The end of the rod remote from the head 19 is pointed, as indicated at 22, and adjacent this pointed end is a further pair of lugs or ears 23. It will be understood that in the assembly of the damper in the pipe, the pipe is first perforated and slotted to permit insertion of the spindle and lugs, and considerable assembly difficulty is experienced if the lugs of the spindle do not line up with the slots in the pipe. In the present disclosure this difficulty is definitely overcome by properly spacing lugs 21 and 23 and locating them on the spindle in substantially the manner shown. Thus, when the spindle is projected into the pipe 11, lugs 21 first enter the slots in the pipe adjacent the spindle head. Following this, the spindle may be rotated to align lugs 23 with corresponding slots in the opening on the other side of the pipe, and lugs 23 will have passed through their respective slots prior to lugs 21 entering one of the loops 14. The importance of this simplified assembly may be more fully appreciated when it is considered that not only must the spindle 13 be installed, but that the spindle must enter and pass through the damper as well during assembly.

The pointed end 22 of the spindle, as has been mentioned, is adapted to interfit and be secured to a handle that is generally indicated by the reference numeral 24. This handle, as shown, includes a C-shaped portion 25, between the ends of which is a conventional wire grip 26. The portion 25 is permanently attached to or formed integral with a tubular member 27 which, adjacent the portion 25, includes a collar 28 having a rolled edge that seats one end coil of a spring 29. It is intended that the edge of the collar 28, following assembly with the spring, be so crimped as to prevent displacement of the spring. The end of the member 27, remote from the collar 28, is of reduced diameter and includes a central opening 30, having outwardly extending recesses 31 on diametrically opposite sides. The opening 30 is of such diameter as to freely receive the pointed end of the spindle 13, and the recesses 31 receive lugs 23. In this manner, the pointed end of the spindle may be projected into the tubular member 27. Within this member, an annular ledge or shoulder 32 is formed at the junction of the different diametered parts thereof, and this shoulder serves to seat lugs 23 when the spindle and handle have been interengaged and relatively rotated. To prevent inadvertent displacement of the lugs from the shoulder 32, small indentations 35 may be formed on the ledge, substantially as shown. A further collar 33, having an opening such as to receive the spindle 13 and lugs 23, completes the handle structure. This collar includes a rolled edge intended to seat the other end coil of the spring 29, and it is desirable that the collar edge be crimped to prevent displacement of the spring. As shown in the drawing, the handle 24 includes a grip portion 26, tubular member 27, spring, and spring joined collar 33.

Figure 2:
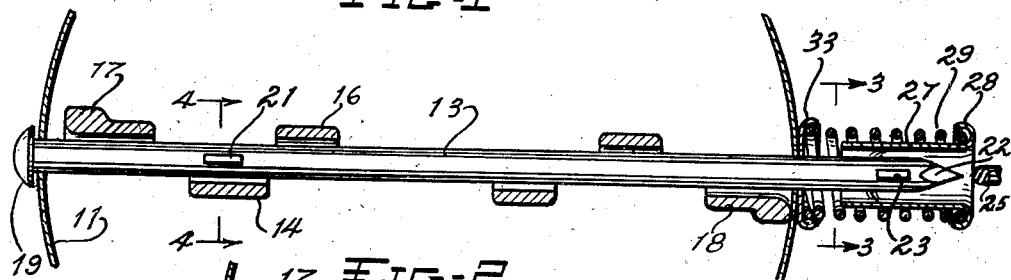
Fig. 2 is an enlarged fragmentary horizontal sectional view taken substantially as indicated by the line 2—2 of Fig. 1.

For a clearer understanding of the invention, assembly of the damper 12, spindle 13, and handle 24 is as follows: Suitable openings 34 and 36 are formed in diametrically opposite sides of the pipe 11. These openings are of only slightly greater diameter than that of the spindle 13, and include opposed lateral slots which, as heretofore mentioned, permit passage therethrough of the lugs 21 and 23. The damper 12 is positioned in the pipe with a passageway defined by loops 14 and 16, substantially in line with the openings 34 and 36. The pointed end of the spindle is first projected through opening 34, thence through collar portion 17, loops 14 and 16, and collar portion 18. As the pointed end 22 enters collar 18, lugs 21 of the spindle approach the pipe 11 and the partially assembled spindle and damper are rotated to register lugs 21 with the slotted opening 34 of the pipe. The spindle is then moved further toward assembled position and spindle and damper may be again rotated together to register lugs 23 with the slotted opening 36 of the pipe. Following this, the spindle is moved to substantially the position shown in Fig. 2 of the drawing, wherein the head 19 is in close proximity with the outer surface of the pipe 11, and lugs 21 rest in a ledge of one of the loop portions 14. The assembled handle 24 is now mounted on the pointed end of the spindle by the simple expedient of interfitting lugs 23 in recesses 31. The handle is moved to compress spring 29, thus causing entry of the lugs 23 well into the tubular member and permitting relative rotation of spindle and handle to seat the lugs in indentations 35. Spring 29, during this last portion of assembly, has been brought under compression and now serves to secure spindle and handle against relative displacement or rotation, and also causes collar 33 and collar portion 18 to frictionally engage opposite surfaces of the pipe 11 in a manner to prevent inadvertent or undesired rotation of the damper in the pipe.

From the foregoing it will be evident that the structure shown and described provides a spindle structure for dampers of an unusual nature and, particularly, one that is at great variance in structural detail with prior spindle structures. Furthermore, it will be evident that the structural parts, being of simple design and construction, may be easily manufactured, readily installed and, when installed, present no hazardous exterior parts or parts that might be objectionable from an appearance standpoint.

Although applicant has shown and described only one form of his invention, it will be apparent to those skilled in the art that variations thereof may be made and are contemplated insofar as they are within the spirit and scope of the invention as set out in the annexed claims.

Having thus set forth my invention what I claim as new and for which I desire protection by Letters Patent is:

1. In a damper structure, the combination of a pipe having suitable spindle perforations therein, a damper spindle having a finished head at one end and a point at the other end, said head and point being located exteriorly of said pipe in spindle assembled position; and a damper plate having a passage extending diametrically across and substantially in the plane of said plate for receiving the spindle, cooperating parts on said spindle and plate, said parts being adapted to be interengaged in a manner to secure said spindle and plate against endwise movement or rotation when said spindle and plate are in assembled relationship, a handle removably secured to the pointed end of said spindle, and spring means carried by said handle operable to frictionally engage an exterior surface of said pipe and cause a corresponding edge of said plate to bear against the adjacent interior surface of said pipe, whereby to restrict the freedom of rotation of said plate with respect to said pipe.

2. In a damper structure, the combination of a pipe having suitable spindle perforations therein, a damper spindle having a finished head at one end and a point at the other end, said head and point being located exteriorly of said pipe in spindle assembled position; and a damper plate having a passage extending diametrically across and substantially in the plane of said plate for receiving the spindle, a set of lugs on said spindle and a locking seat on said plate, said lugs and seat cooperating to be interengaged in a manner to secure said spindle and plate against endwise movement or rotation when said spindle and plate are in assembled relationship, a handle removably secured to the pointed end of said spindle, and spring means carried by said handle operable to frictionally engage an exterior surface of said pipe and cause a corresponding edge of said plate to bear against the adjacent interior surface of said pipe, whereby to restrict the freedom of rotation of said plate with respect to said pipe.

3. In a damper structure, the combination of a pipe having suitable spindle perforations therein, a damper spindle having a finished head at one end and a point at the other end, said head and point being located exteriorly of said pipe in spindle assembled position; and a damper plate having a passage extending diametrically across and substantially in the plane of said plate for receiving the spindle, cooperating parts on said spindle and plate, said parts being adapted to be interengaged in a manner to secure said spindle and plate against endwise movement or rotation when said spindle and plate are in assembled relationship, a handle removably secured to the pointed end of said spindle, spring means interposed between said handle and the exterior surface of said pipe, said spring means being operable to frictionally engage said exterior surface, and cause a corresponding edge of said plate to bear against the adjacent interior surface of said pipe, thereby securing said cooperating parts against disengagement.

CARL R. ANDERSON.